United States Patent
Kaufman et al.

(10) Patent No.: US 10,704,696 B2
(45) Date of Patent: Jul. 7, 2020

(54) FLUID TRANSPORTATION SYSTEM

(71) Applicant: Hamilton Sundstrand Corporation, Charlotte, NC (US)

(72) Inventors: Cory Kaufman, Webster, TX (US); Samuel Anderson, Houston, TX (US); Gary Robert Spexarth, Houston, TX (US); Cassandra Allen, Needville, TX (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 49 days.

(21) Appl. No.: 16/172,278

(22) Filed: Oct. 26, 2018

(65) Prior Publication Data

US 2020/0132202 A1    Apr. 30, 2020

(51) Int. Cl.
*F17C 13/04* (2006.01)
*F16K 11/085* (2006.01)
*B64G 6/00* (2006.01)
*F17C 13/00* (2006.01)

(52) U.S. Cl.
CPC ............ *F16K 11/0853* (2013.01); *B64G 6/00* (2013.01); *F17C 13/008* (2013.01); *F17C 13/04* (2013.01); *F17C 2205/0323* (2013.01); *F17C 2250/0443* (2013.01)

(58) Field of Classification Search
None
See application file for complete search history.

(56) References Cited

U.S. PATENT DOCUMENTS

| 2,758,747 A | * | 8/1956 | Stevens ................... B60P 3/246 220/530 |
| 3,438,215 A | * | 4/1969 | Frijlink ................... F17C 3/022 62/45.1 |
| 3,751,727 A | | 8/1973 | Shepard et al. |

(Continued)

FOREIGN PATENT DOCUMENTS

| FR | 2636095 | 9/1990 |
| GB | 1023870 | 3/1966 |
| WO | 9622222 A1 | 7/1996 |

OTHER PUBLICATIONS

European Search Report; European Application No. 19193555.0; filed Aug. 26, 2019; Date of Completion of Search Mar. 12, 2020; dated Apr. 1, 2020 (5 pages).

*Primary Examiner* — John Fox
(74) *Attorney, Agent, or Firm* — Cantor Colburn LLP

(57) ABSTRACT

Disclosed is a system for transporting fluid, including a first vessel and a second vessel, the system including: a split volume tank comprising a first volume and a second volume, wherein when one of the volumes expands the other volume collapses; and a four way valve fluidly connecting the first and second volumes and first vessel and the second vessel, the four way valve comprising a plurality of passages including a first passage and a second passage, the four way valve being controllable between a plurality of orientations including: a first orientation in which the first passage fluidly connects the first volume and the first vessel and the second passage fluidly connects the second volume and the second vessel; a second orientation in which the first passage fluidly connects the first volume and the second vessel and the second passage fluidly connects the second volume and the first vessel.

20 Claims, 2 Drawing Sheets

(56) References Cited

U.S. PATENT DOCUMENTS

| | | | |
|---|---|---|---|
| 3,880,326 A | 4/1975 | Kennard et al. | |
| 4,392,508 A * | 7/1983 | Switall | A01M 7/0092 |
| | | | 137/99 |
| 4,544,328 A * | 10/1985 | Credle, Jr. | B67D 1/103 |
| | | | 222/66 |
| 2015/0004013 A1 * | 1/2015 | Giovangrossi | B60T 17/06 |
| | | | 417/275 |
| 2017/0167442 A1 * | 6/2017 | Kawaguchi | F02K 9/50 |
| 2020/0030518 A1 * | 1/2020 | Brugger | A61M 1/367 |

* cited by examiner

FLUID TRANSPORTATION SYSTEM

BACKGROUND

Exemplary embodiments pertain to the art of fluid systems and more specifically to a fluid transportation system.

Conditions may exist where fluid should be transferred between two vessels having a relative pressure differential therebeween, and where the transfer of fluid should not include an accompanying transfer of pressure. For example, conditions may exist where a person in outer space intends on releasing a stream of fluid to space vacuum, though an intermediate vessel, without exposing themselves directly to hard vacuum. A solution is desired to accomplish such fluid transfer in a controlled manor without a decrement in pressure.

BRIEF DESCRIPTION

Disclosed is system for transporting fluid, including a first vessel and a second vessel, the system comprising: a split volume tank comprising a first volume and a second volume, wherein when one of the volumes expands the other volume simultaneously collapses; and a four way valve, the four way valve fluidly connecting the first and second volumes and first vessel and the second vessel, the four way valve comprising a plurality of passages including a first passage and a second passage, the four way valve being controllable between a plurality of orientations including: a first orientation in which the first passage fluidly connects the first volume and the first vessel and the second passage fluidly connects the second volume and the second vessel; a second orientation in which the first passage fluidly connects the first volume and the second vessel and the second passage fluidly connects the second volume and the first vessel.

In addition to one or more of the disclosed features or as an alternate the first vessel is a pressured spacesuit and the second vessel is under vacuum pressure from outer-space, and the system includes a plurality of conduits including a first conduit connected between the first valve and the spacesuit and a second conduit connected between the first valve and the second vessel.

In addition to one or more of the disclosed features or as an alternate the system includes a first switch disposed in the first conduit that regulates flow through the first conduit.

In addition to one or more of the disclosed features or as an alternate the first switch is a normally closed switch.

In addition to one or more of the disclosed features or as an alternate the system includes a flow meter in the first conduit for measuring or indicating a fluid flow between the first vessel and the first valve.

In addition to one or more of the disclosed features or as an alternate the first conduit includes a first shutoff valve.

In addition to one or more of the disclosed features or as an alternate the system includes a second conduit fluidly connecting the first valve and the second vessel.

In addition to one or more of the disclosed features or as an alternate the second conduit includes a second shutoff valve.

In addition to one or more of the disclosed features or as an alternate the first and second conduits include connectors for fluidly connecting the first and second conduits to the first and second vessel, respectively.

In addition to one or more of the disclosed features or as an alternate the system includes a capacitance vessel fluidly connected between the first conduit and the first vessel.

Further disclosed is a method of transporting fluid between a plurality of vessels including a first vessel and a second vessel, the method comprising: fluidly connecting the plurality of vessels to a respective plurality of ports on a four way valve; configuring the four way to a first orientation wherein the four way valve fluidly connects a first volume in a split volume tank to the first vessel and fluidly connects a second volume in the split volume tank to the second vessel; simultaneously (i) draining fluid from the first vessel to the first volume, and (ii) draining fluid from the second volume to the second vessel; expelling fluid from the second vessel, away from the system; configuring the four way valve to a second orientation wherein the four way valve fluidly connects the first volume to the second vessel and fluidly connects the second volume to the first vessel; simultaneously (iii) draining fluid from the first vessel to the second volume, and (iv) draining fluid from the first volume to the second vessel; and expelling fluid from the second vessel, away from the system. In addition, the first vessel and second vessel may be sufficiently large or controlled by adding/expelling of fluid such that there is little/no resulting pressure change of either vessel.

In addition to one or more of the disclosed features or as an alternate the method includes fluidly connecting the first valve and the first vessel with a first conduit, wherein the first conduit includes a first switch, the first switch being a flow regulating switch.

In addition to one or more of the disclosed features or as an alternate the method includes throttling flow through the first conduit with a first switch.

In addition to one or more of the disclosed features or as an alternate the method includes releasing the first switch to terminate flow through the first conduit.

In addition to one or more of the disclosed features or as an alternate the method includes measuring or indicating a flow rate in the first conduit with a flow meter.

In addition to one or more of the disclosed features or as an alternate the method includes opening or closing a fluid connection between the first valve and the first vessel with a first shutoff valve.

In addition to one or more of the disclosed features or as an alternate the method includes connecting the first valve to the second vessel with a second conduit, wherein the system includes a plurality of conduits including the first conduit and the second conduit.

In addition to one or more of the disclosed features or as an alternate the method includes opening or closing a fluid connection between the first valve and the second vessel with a second shutoff valve.

In addition to one or more of the disclosed features or as an alternate the method includes fluidly connecting the plurality of conduits to the respective plurality of vessels with a respective plurality of connectors.

In addition to one or more of the disclosed features or as an alternate the method includes regulating flow into the first conduit from the first vessel with a capacitance vessel fluidly connected between the first connector and the first vessel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
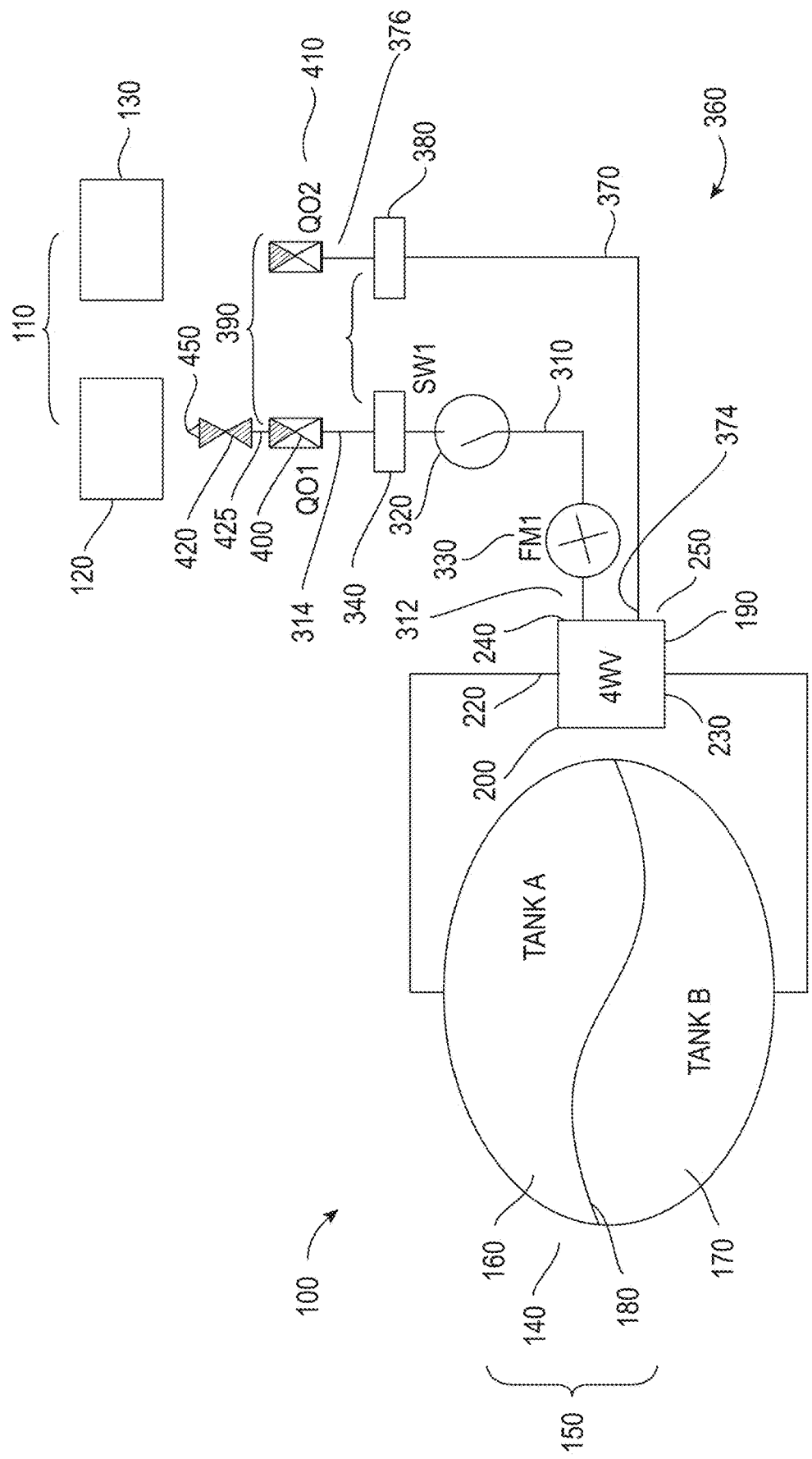
FIG. 1 illustrates a system for transferring fluid from a high pressure source to a low pressure source according to an embodiment, wherein the system includes a four way valve.

Turning to FIG. 1, disclosed is a system 100 for transferring fluid between a plurality of vessels 110 under a respective plurality of pressures without an accompanying change of pressure between the vessels 110. The plurality of vessels 110 including a first vessel 120 and a second vessel 130, where the first vessel 120 is maintained at a higher pressure than the second vessel 130.

The system 100 may include a tank 140 that is a split volume tank. The tank 140 may comprise a plurality of volumes 150 including a first volume 160 and a second volume 170. The tank 140 may be configured so that when one of the plurality of volumes 150 expands another of the plurality of volumes 150 simultaneously collapses. In one embodiment a flexible diaphragm 180 may be disposed in the tank 140 and provide for creating the plurality of volumes 150 in the tank 140.

The system 100 may include a first valve 190 that may be a four way valve. The first valve 190 may fluidly connect the plurality of volumes 150 and the plurality of vessels 110. The first valve 190 may include a body 200 having a plurality of ports 210 including a first port 220, a second port 230, a third port 240 and a fourth port 250. The plurality of ports 210 may converge at an internal valve chamber 260. The chamber 260 may include a plug 270 having a plurality of passages 280 including a first passage 290 and a second passage 300. In the disclosed embodiments the first port 220 may be fluidly connected the first volume 160, the second port 230 may be fluidly connected to the second volume 170, the third port 240 may be fluidly connected to the first vessel 120 and the fourth port 250 may be fluidly connected to the second vessel 130.

Figure 2:
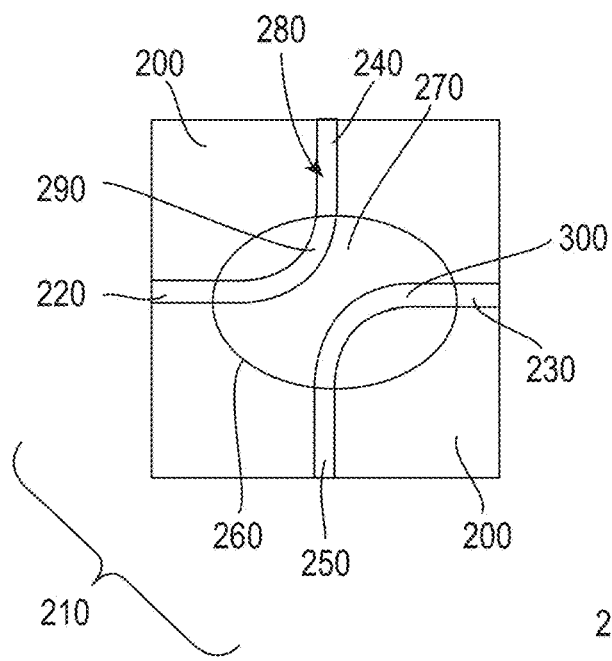
FIG. 2 illustrates a first configuration of the four way valve to effect fluid transfer according to an embodiment.
Figure 3:
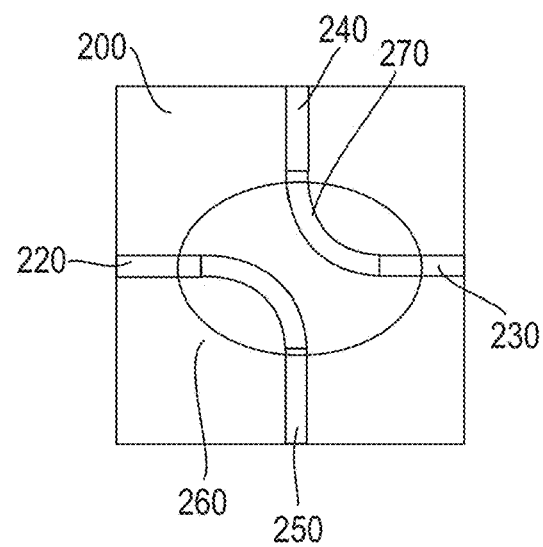
FIG. 3 illustrates a second configuration of the four way valve to effect fluid transfer according to an embodiment.
Figure 4:
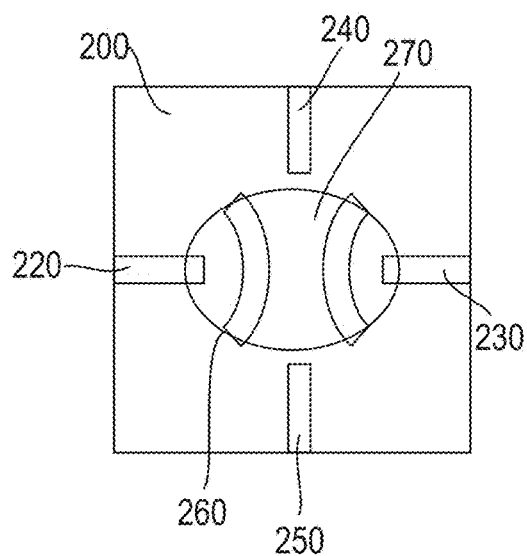
FIG. 4 illustrates a configuration of the four way valve to prevent fluid transfer according to an embodiment.

The first valve 190 may be controllable between a plurality of orientations. In a first orientation illustrated in FIG. 2, the first passage 290 fluidly connects the first volume 160 and the first vessel 120, and the second passage 300 fluidly connects the second volume 170 and the second vessel 130. In a second orientation illustrated in FIG. 3, the first passage 290 fluidly connects the first volume 160 and the second vessel 130 and the second passage 300 fluidly connects the second volume 170 and the first vessel 120. In a third orientation illustrated in FIG. 4, flow is prevented through the first valve 190.

In one use of the disclosed embodiments, when the first valve 190 is in the first orientation, fluid from the first vessel 120 may fill the first volume 160. During this time, pressure from the first vessel 120 biases the diaphragm 180 to expand the first volume 160 and contract the second volume 170 in the tank 140. Any fluid in the second volume 170 may be expelled to the second vessel 130. When the first volume 160 is filled, the second volume 170 may be empty. At this time the first valve 190 may be engaged to provide the second orientation. As fluid continues to flow from the first vessel 120, fluid may enter the second volume 170. Pressure from the first vessel 120 will now expand the second volume 170 and contract the first volume 160, thereby expelling fluid from the first volume 160 to the second vessel 130.

In a situation where the second vessel 130 is capable of being purged for example by draining, the above cycle of filling one of the volumes with fluid from the first vessel 120 while draining another of the volumes to the second vessel 130 may continue for as long as fluid and pressure remain in the first vessel 120. Thus, continuous flow between the vessels may be accomplished. In addition, the fluid transfer may occur without an accompanying change in pressure differential between vessel 120 and vessel 130. For example, the first vessel and second vessel may be sufficiently large or controlled by adding/expelling of fluid such that there is little/no resulting pressure change of either vessel. Once the first vessel 120 is drained, that is, at the completion of the fluid transfer, the first valve 190 may be placed in the closed orientation.

Turning back to FIG. 1, the system 100 may include a first conduit 310 fluidly connecting the first valve 190 at a first end 312 of the first conduit and the first vessel 120 at a second end 314 of the first conduit. The first conduit 310 may include a first switch 320. The first switch 320 may be a flow regulating switch. Such a switch may be utilized to control backpressure induced from flow in the first conduit 310 toward the tank 140, for example, by selectively throttling flow. The first switch 320 may be a normal closed switch. Accordingly in a manually controlled environment, engagement with the first switch 320 may be required to provide for flow between the first vessel 120 and the first valve 190. This configuration enables avoiding a situation where unregulated flow may travel from the first vessel 120 to the first valve 190. The switch 320 may also provide an effective emergency brake to the system 100 for example, to prevent unanticipated and continual fluid flow from the first vessel 120 for example if the first conduit 310 where to rupture.

According to an embodiment a flow meter 330 may be provided in the first conduit 310 for measuring fluid flow between the first valve 190 and the first vessel 120. The flow meter 330 may capable of providing a user of the system with operating feedback. For example, the meter may enable the user to determine if there is sufficient flow out of the first vessel 120 such that the system 100 is operating properly.

According to an embodiment the first conduit 310 may include a second valve 340. The second valve 340 may be a first shutoff valve. The second valve 340 may be located at the second end 314 of the first conduit 310. This enables protecting the system 100 when the first conduit 310 is unattached to the first vessel 120. The second valve 340 may be manually engaged or may be automatically engaged such as a self-sealing connection to vessel 120.

According to an embodiment the system 100 includes a plurality of conduits 360 including the first conduit 310 and a second conduit 370. The second conduit 370 may fluidly connect the first valve 190 at a first end 374 of the second conduit and the second vessel 130 at a second end 376 of the second conduit. The second conduit 370 may include a third valve 380. The third valve 380 may be located at the second end 376 of the second conduit 370. As with the second valve 340, this configuration enables protecting the system 100 when, for example, the second conduit 370 is unattached to the second vessel 130. Thus the second valve 340 and third valve 380 function as flow access valves.

According to an embodiment the plurality of conduits 360 may include a respective plurality of connectors 390, including a first connector 400 and a second connector 410, for securely connecting the plurality of conduits 360 to the respective plurality of vessels 110. The plurality of connectors 390 may be quick-connectors. The plurality of connectors 390 may also include the plurality of flow access valves 340 and 380 such as self-sealing quick-connectors.

In one embodiment a capacitance vessel 420 may be connected to the first conduit 310 to regulate flow between the first connector 400 and the first vessel 120. In one embodiment the capacitance vessel 420 may include a fourth valve 450 which may be a spring loaded check valve, preventing backflow to the first vessel 120. The capacitance vessel 420 buffers non-linear changes in pressure into the first conduit 310 in circumstances where flow into to the first conduit 310 is variable. According to an embodiment the plurality of conduits 360 are flexible tubes. As such the system 100 is more easily connectable to the plurality of vessels 110 in a situation where the system 100 and the plurality of vessels 110 are capable of independent motion.

In one application embodiment the first vessel 120 is a pressurized spacesuit and the second vessel 130 is fluidly connected to outer space and is thus subjected to vacuum pressure, that is, zero (0) pounds per square inch absolute (PSIA). A benefit of the disclosed embodiments is a reduced risk of damage in and within the spacesuit. In such application the fluid flow maybe urine or mixture of urine and gas. The pressure differential from within the spacesuit and space would result in expansion of the diagram in the tank with each change in orientation of the four way valve. This would effectively flush the fluid out of the tank volume that is connected to the second vessel, enabling the first volume to receive additional fluid.

In a spacesuit application the capacitance vessel would buffer non-linear changes in pressure generated from inherently nonlinear flow of urine from a human body. The normally closed switch would function as a deadman switch to protect the person if there should be a rupture in the system, as well as provide for a more comfortable transfer of fluid by controlling the switch. The flow meter would enable the persons to determine if the fluid is flowing at an expected rate to and through the first valve.

Further, in the spacesuit application the quick-connect connections to a spacesuit with shutoff valves on the conduit side of the quick-connects enable usages with a plurality of persons with respective suits and quick-connect connectors. The disclosed embodiments prevent decompression of the spacesuits and have an effective endless capacity to receive fluid from serial users. The second vessel in this usage might be a spacecraft to which the persons are tethered. It is within the scope of the disclosed embodiments with such usage to vent the second conduit directly to space. The disclosed embodiments provide an effective limitless volume for continuously collecting such fluid using a relatively small and therefore low mass tank.

The above disclosed embodiments provide a system that uses pressure differentials to move fluid from one place to another. This may be accomplished with a diaphragm tank controlled to allow variable flows and quantities of fluid to be collected while providing protection to backflow or undesirable pressure changes.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for transporting fluid, including a first vessel and a second vessel, the system comprising:
    a split volume tank comprising a first volume and a second volume, wherein when one of the volumes expands the other volume simultaneously collapses; and
    a four way valve, the four way valve fluidly connecting the first and second volumes and first vessel and the second vessel, the four way valve comprising a plurality of passages including a first passage and a second passage, the four way valve being controllable between a plurality of orientations including:
    a first orientation in which the first passage fluidly connects the first volume and the first vessel and the second passage fluidly connects the second volume and the vacuum;
    a second orientation in which the first passage fluidly connects the first volume and the second vessel and the second passage fluidly connects the second volume and the first vessel.

2. The system of claim 1 wherein the first vessel is a pressured spacesuit and the second vessel is under vacuum pressure from outer-space, and the system includes a plurality of conduits including a first conduit connected between the four way valve and the spacesuit.

3. The system of claim 2, further comprising a first switch disposed in the first conduit that regulates flow through the first conduit.

4. The system of claim 3, wherein the first switch is a normally closed switch.

5. The system of claim 4, further comprising a flow meter in the first conduit for measuring a fluid flow between the first vessel and the four way valve.

6. The system of claim 5, wherein the first conduit includes a first shutoff valve.

7. The system of claim 6, further comprising:
    a second conduit fluidly connecting the four way valve and the second vessel.

8. The system of claim 7, wherein the second conduit includes a second shutoff valve.

9. The system of claim 8, wherein the first and second conduits include connectors for fluidly connecting the first and second conduits to the first and second vessels, respectively.

10. The system of claim 9, further comprising:
a capacitance vessel fluidly connected between the first conduit and the first vessel.

11. A method of transporting fluid between a plurality of vessels including a first vessel and a second vessel, the method comprising:
fluidly connecting the plurality of vessels to a respective plurality of ports on a four way valve;
configuring the four way to a first orientation wherein the four way valve fluidly connects a first volume in a split volume tank to the first vessel and fluidly connects a second volume in the split volume tank to the second vessel;
simultaneously (i) draining fluid from the first vessel to the first volume, and (ii) draining fluid from the second volume to the second vessel;
configuring the four way valve to a second orientation wherein the four way valve fluidly connects the first volume to the second vessel and fluidly connects the second volume to the first vessel;
simultaneously (iii) draining fluid from the first vessel to the second volume, and (iv) draining fluid from the first volume to the second vessel.

12. The method of claim 11, comprising
fluidly connecting the four way valve and the first vessel with a first conduit, wherein the first conduit includes a first switch, the first switch being a flow regulating switch.

13. The method of claim 12, comprising throttling flow through the first conduit with a first switch.

14. The method of claim 13 comprising releasing first the switch to terminate flow through the first conduit.

15. The method of claim 14 comprising measuring a flow rate in the first conduit with a flow meter.

16. The method of claim 15 comprising opening or closing a fluid connection between the four way valve and the first vessel with a first shutoff valve.

17. The method of claim 16 comprising connecting the four way valve to the second vessel with a second conduit, wherein the system includes a plurality of conduits including the first conduit and the second conduit.

18. The method of claim 17 comprising opening or closing a fluid connection between the four way valve and the second vessel with a second shutoff valve.

19. The method of claim 18 comprising fluidly connecting the plurality of conduits to the respective plurality of vessels with a respective plurality of connectors.

20. The method of claim 19 comprising buffering pressure of the first conduit from the first vessel with a capacitance vessel fluidly connected between the first connector and the first vessel.

* * * * *